United States Patent
Farlee et al.

(10) Patent No.: US 9,558,078 B2
(45) Date of Patent: Jan. 31, 2017

(54) POINT IN TIME DATABASE RESTORE FROM STORAGE SNAPSHOTS

(71) Applicant: Microsoft Technology Licensing, LLC, Redmond, WA (US)

(72) Inventors: Kevin Farlee, Maple Valley, WA (US); Lin Chan, Redmond, WA (US); Andrew Jason Cherry, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 14/526,137

(22) Filed: Oct. 28, 2014

(65) Prior Publication Data

US 2016/0117228 A1 Apr. 28, 2016

(51) Int. Cl.
*G06F 11/14* (2006.01)

(52) U.S. Cl.
CPC ....... *G06F 11/1469* (2013.01); *G06F 11/1471* (2013.01); *G06F 11/1451* (2013.01); *G06F 2201/80* (2013.01); *G06F 2201/84* (2013.01)

(58) Field of Classification Search
CPC .............. G06F 11/1446; G06F 11/1435; G06F 11/2048; G06F 11/0787; G06F 11/1461; G06F 17/30097; G06F 17/30194; G06F 17/30592; G06F 17/5022
See application file for complete search history.

(56) References Cited

U.S. PATENT DOCUMENTS

| | | | |
|---|---|---|---|
| 5,175,849 A | 12/1992 | Schneider | |
| 5,193,162 A | 3/1993 | Bordsen et al. | |
| 5,193,181 A | 3/1993 | Barlow et al. | |
| 5,261,102 A | 11/1993 | Hoffman | |
| 5,313,612 A | 5/1994 | Satoh et al. | |
| 5,317,731 A | 5/1994 | Dias et al. | |

(Continued)

FOREIGN PATENT DOCUMENTS

| | | |
|---|---|---|
| WO | 2004021677 | 3/2004 |
| WO | WO2013138969 A1 | 9/2013 |

OTHER PUBLICATIONS

Continuous Archiving and Point-in-Time Recovery (PITR), Published on: Aug. 30, 2011, Available at: http://www.postgresql.org/docs/9.1/static/continuous-archiving.html.

(Continued)

*Primary Examiner* — Nadeem Iqbal

(74) *Attorney, Agent, or Firm* — Aneesh Mehta; Kate Drakos; Micky Minhas

(57) ABSTRACT

Archiving a database and point in time recovery of the database. A method includes taking a first snapshot of a database. The first snapshot of the database includes a first snapshot of the data in the data storage and a first snapshot of the log records in the log storage. The method further includes taking a second snapshot of the database. The second snapshot of the database includes a second snapshot of the data in data storage and a second snapshot of the log records. The method further includes restoring the database to a particular point by applying the first snapshot of the data in the data storage to the database, applying the first snapshot of the log records in the log storage to the database and applying a portion of the second snapshot of the log records in the log storage to the database.

23 Claims, 9 Drawing Sheets

(56) References Cited

U.S. PATENT DOCUMENTS

| | | |
|---|---|---|
| 5,446,871 A | 8/1995 | Sholmer et al. |
| 5,455,946 A | 10/1995 | Mohan et al. |
| 5,493,649 A | 2/1996 | Slivka et al. |
| 5,517,643 A | 5/1996 | Davy |
| 5,537,533 A | 7/1996 | Staheli et al. |
| 5,568,629 A | 10/1996 | Gentry et al. |
| 5,621,882 A | 4/1997 | Kakuta |
| 5,664,148 A | 9/1997 | Mulla et al. |
| 5,664,189 A | 9/1997 | Wilcox et al. |
| 5,678,042 A | 10/1997 | Pisello et al. |
| 5,720,026 A | 2/1998 | Sakakura et al. |
| 5,758,359 A | 5/1998 | Saxon |
| 5,805,785 A | 9/1998 | Dias et al. |
| 5,813,017 A | 9/1998 | Morris |
| 5,857,208 A | 1/1999 | Ofek |
| 5,870,758 A | 2/1999 | Bamford et al. |
| 5,875,479 A | 2/1999 | Blount et al. |
| 5,884,328 A | 3/1999 | Mosher |
| 5,905,988 A | 5/1999 | Schwartz et al. |
| 5,930,824 A | 7/1999 | Anglin et al. |
| 5,978,813 A | 11/1999 | Foltz et al. |
| 5,987,506 A | 11/1999 | Carter et al. |
| 6,018,746 A | 1/2000 | Hill et al. |
| 6,047,294 A | 4/2000 | Deshayes et al. |
| 6,061,769 A | 5/2000 | Kapulka et al. |
| 6,061,770 A | 5/2000 | Franklin |
| 6,065,018 A | 5/2000 | Beier et al. |
| 6,072,952 A | 6/2000 | Janakiraman |
| 6,076,148 A | 6/2000 | Kedem |
| 6,105,030 A | 8/2000 | Syed et al. |
| 6,175,932 B1 | 1/2001 | Foote et al. |
| 6,223,269 B1 | 4/2001 | Blumenau |
| 6,247,141 B1 | 6/2001 | Homberg |
| 6,260,120 B1 | 7/2001 | Blumenau et al. |
| 6,269,431 B1 | 7/2001 | Dunham |
| 6,311,288 B1 | 10/2001 | Heeren et al. |
| 6,324,654 B1 | 11/2001 | Wahl et al. |
| 6,327,579 B1 | 12/2001 | Crawford |
| 6,362,870 B2 | 3/2002 | Mui et al. |
| 6,373,988 B1 | 4/2002 | Thorell et al. |
| 6,434,681 B1 | 8/2002 | Armangau |
| 6,438,749 B1 | 8/2002 | Chamberlain |
| 6,449,625 B1 | 9/2002 | Wang |
| 6,453,325 B1 | 9/2002 | Cabrera et al. |
| 6,487,677 B1 | 11/2002 | Jantz et al. |
| 6,490,691 B1 | 12/2002 | Kimura et al. |
| 6,553,388 B1 | 4/2003 | Perks |
| 6,606,651 B1 | 8/2003 | Linde |
| 6,618,822 B1 | 9/2003 | Loaiza et al. |
| 6,618,851 B1 | 9/2003 | Zundel et al. |
| 6,647,399 B2 | 11/2003 | Zaremba |
| 6,665,815 B1 | 12/2003 | Goldstein et al. |
| 6,691,140 B1 | 2/2004 | Bogrett |
| 6,714,980 B1 | 3/2004 | Markson et al. |
| 6,728,848 B2 | 4/2004 | Tamura et al. |
| 6,732,125 B1 | 5/2004 | Autrey et al. |
| 6,742,139 B1 | 5/2004 | Forsman et al. |
| 6,771,843 B1 | 8/2004 | Huber et al. |
| 6,785,786 B1 | 8/2004 | Gold et al. |
| 6,792,517 B1 | 9/2004 | Brunnett et al. |
| 6,792,518 B2 | 9/2004 | Armangau et al. |
| 6,795,895 B2 | 9/2004 | Merkey et al. |
| 6,833,073 B2 | 12/2004 | Agarwal |
| 6,898,608 B2 | 5/2005 | Hopeman et al. |
| 6,912,631 B1 | 6/2005 | Kekre et al. |
| 6,915,315 B2 | 7/2005 | Autrey et al. |
| 6,931,531 B1 | 8/2005 | Takahashi |
| 6,938,134 B2 | 8/2005 | Madany |
| 6,940,855 B2 | 9/2005 | Okamura |
| 6,950,871 B1 | 9/2005 | Honma et al. |
| 6,978,282 B1 | 12/2005 | Dings et al. |
| 6,981,177 B2 | 12/2005 | Beattie |
| 7,007,043 B2 | 2/2006 | Farmer et al. |
| 7,010,553 B2 | 3/2006 | Chen et al. |
| 7,043,503 B2 | 5/2006 | Haskin et al. |
| 7,051,050 B2 | 5/2006 | Chen et al. |
| 7,058,849 B2 | 6/2006 | Erstad |
| 7,065,671 B2 | 6/2006 | Nishimura |
| 7,082,446 B1 | 7/2006 | Bottomley |
| 7,093,086 B1 | 8/2006 | Van Rietschote |
| 7,096,382 B2 | 8/2006 | Novick |
| 7,099,900 B1 | 8/2006 | Bromley et al. |
| 7,107,486 B2 | 9/2006 | Okada et al. |
| 7,133,884 B1 | 11/2006 | Murley et al. |
| 7,143,307 B1 | 11/2006 | Witte et al. |
| 7,155,586 B1 | 12/2006 | Wagner et al. |
| 7,165,156 B1 | 1/2007 | Cameron et al. |
| 7,171,511 B2 | 1/2007 | Yagawa |
| 7,181,476 B2 | 2/2007 | Lee et al. |
| 7,185,081 B1 | 2/2007 | Liao |
| RE39,549 E | 4/2007 | Syed et al. |
| 7,206,911 B2 | 4/2007 | Wolfgang et al. |
| 7,216,135 B2 | 5/2007 | Sawdon et al. |
| 7,237,021 B2 | 6/2007 | Penney et al. |
| 7,246,275 B2 | 7/2007 | Therrien et al. |
| 7,251,716 B2 | 7/2007 | Nagae et al. |
| 7,251,749 B1 | 7/2007 | Fong et al. |
| 7,254,682 B1 | 8/2007 | Arbon |
| 7,257,595 B2 | 8/2007 | Verma et al. |
| 7,263,590 B1 | 8/2007 | Todd et al. |
| 7,272,666 B2 | 9/2007 | Rowan et al. |
| 7,277,905 B2 | 10/2007 | Randal et al. |
| 7,287,133 B2 | 10/2007 | Rowan et al. |
| 7,290,102 B2 | 10/2007 | Lubbers et al. |
| 7,296,115 B2 | 11/2007 | Kano |
| 7,296,382 B2 | 11/2007 | Sack |
| 7,356,679 B1 | 4/2008 | Le et al. |
| 7,373,364 B1 * | 5/2008 | Chapman ............ G06F 11/1451 |
| 7,373,366 B1 | 5/2008 | Chatterjee et al. |
| 7,395,278 B2 | 7/2008 | Zwilling et al. |
| 7,406,487 B1 | 7/2008 | Gupta |
| 7,406,488 B2 | 7/2008 | Stager et al. |
| 7,418,547 B2 | 8/2008 | Lam |
| 7,426,618 B2 | 9/2008 | Vu et al. |
| 7,437,603 B2 | 10/2008 | Ebata et al. |
| 7,440,965 B1 | 10/2008 | Pruthi et al. |
| 7,447,939 B1 | 11/2008 | Faulkner et al. |
| 7,461,293 B2 | 12/2008 | Ohno et al. |
| 7,536,529 B1 | 5/2009 | Chatterjee et al. |
| 7,552,358 B1 | 6/2009 | Asgar-Deen et al. |
| 7,574,622 B2 | 8/2009 | Soran et al. |
| 7,577,689 B1 | 8/2009 | Masinter et al. |
| 7,577,692 B1 | 8/2009 | Corbett et al. |
| 7,610,314 B2 | 10/2009 | Souder et al. |
| 7,613,945 B2 | 11/2009 | Soran et al. |
| 7,620,785 B1 | 11/2009 | Coulter et al. |
| 7,676,502 B2 | 3/2010 | Atluri et al. |
| 7,698,401 B2 | 4/2010 | Atluri et al. |
| 7,720,817 B2 | 5/2010 | Stager et al. |
| 7,734,909 B1 | 6/2010 | Roush et al. |
| 7,743,178 B2 | 6/2010 | Warren et al. |
| 7,752,166 B2 | 7/2010 | Quinlan et al. |
| 7,814,057 B2 | 10/2010 | Kathuria et al. |
| 7,814,367 B1 | 10/2010 | Squibb et al. |
| 7,822,715 B2 | 10/2010 | Petruzzo |
| 7,827,350 B1 | 11/2010 | Jiang et al. |
| 7,839,865 B2 | 11/2010 | Doherty et al. |
| 7,849,257 B1 | 12/2010 | Kim |
| 7,853,571 B2 | 12/2010 | Ranade et al. |
| 7,860,832 B2 | 12/2010 | Midgley et al. |
| 7,979,656 B2 | 7/2011 | Atluri et al. |
| 7,979,741 B2 | 7/2011 | Amano et al. |
| 8,019,925 B1 | 9/2011 | Vogan et al. |
| 8,028,194 B2 | 9/2011 | Atluri et al. |
| 8,055,745 B2 | 11/2011 | Atluri et al. |
| 8,069,227 B2 | 11/2011 | Atluri et al. |
| 8,095,511 B2 * | 1/2012 | Zwilling ............ G06F 11/1451 |
| | | 707/649 |
| 8,209,680 B1 | 6/2012 | Le et al. |
| 8,224,786 B2 | 7/2012 | Atluri et al. |
| 8,364,648 B1 * | 1/2013 | Sim-Tang ......... G06F 17/30368 |
| | | 707/674 |
| 8,521,695 B2 | 8/2013 | Zwilling et al. |
| 8,527,470 B2 | 9/2013 | Atluri et al. |

(56) References Cited

U.S. PATENT DOCUMENTS

| | | |
|---|---|---|
| 8,527,721 B2 | 9/2013 | Atluri et al. |
| 8,601,225 B2 | 12/2013 | Atluri et al. |
| 8,683,144 B2 | 3/2014 | Atluri et al. |
| 8,732,136 B2 | 5/2014 | Atluri et al. |
| 8,838,528 B2 | 9/2014 | Atluri et al. |
| 8,868,858 B2 | 10/2014 | Atluri et al. |
| 8,949,395 B2 | 2/2015 | Atluri et al. |
| 9,098,455 B2 | 8/2015 | Atluri et al. |
| 9,209,989 B2 | 12/2015 | Atluri et al. |
| 2001/0011265 A1 | 8/2001 | Cuan et al. |
| 2001/0029477 A1 | 10/2001 | Freeman et al. |
| 2001/0044807 A1 | 11/2001 | Kleiman et al. |
| 2001/0056525 A1 | 12/2001 | Selkirk et al. |
| 2002/0007363 A1 | 1/2002 | Vaitzblit |
| 2002/0008795 A1 | 1/2002 | Koyama et al. |
| 2002/0087950 A1 | 7/2002 | Brodeur et al. |
| 2002/0095479 A1 | 7/2002 | Schmidt |
| 2002/0124013 A1 | 9/2002 | Loy et al. |
| 2002/0136162 A1 | 9/2002 | Yoshimura et al. |
| 2002/0147941 A1 | 10/2002 | Gentile |
| 2002/0178146 A1 | 11/2002 | Akella et al. |
| 2002/0198699 A1 | 12/2002 | Greene et al. |
| 2003/0023676 A1 | 1/2003 | Slater |
| 2003/0028736 A1 | 2/2003 | Berkowitz et al. |
| 2003/0046260 A1 | 3/2003 | Satyanarayanan et al. |
| 2003/0056139 A1 | 3/2003 | Murray et al. |
| 2003/0061456 A1 | 3/2003 | Ofek et al. |
| 2003/0061537 A1 | 3/2003 | Cha et al. |
| 2003/0070042 A1 | 4/2003 | Byrd et al. |
| 2003/0070043 A1 | 4/2003 | Merkey |
| 2003/0093444 A1 | 5/2003 | Huxoll |
| 2003/0093579 A1 | 5/2003 | Zimmer et al. |
| 2003/0097611 A1 | 5/2003 | Delaney et al. |
| 2003/0117306 A1 | 6/2003 | Okuda et al. |
| 2003/0126238 A1 | 7/2003 | Kohno et al. |
| 2003/0135703 A1 | 7/2003 | Martin et al. |
| 2003/0149752 A1 | 8/2003 | Baldwin et al. |
| 2003/0158861 A1 | 8/2003 | Sawdon et al. |
| 2003/0158873 A1 | 8/2003 | Sawdon et al. |
| 2003/0167380 A1 | 9/2003 | Green et al. |
| 2003/0172158 A1 | 9/2003 | Pillai et al. |
| 2003/0204534 A1 | 10/2003 | Hopeman et al. |
| 2003/0208511 A1 | 11/2003 | Earl et al. |
| 2003/0212789 A1 | 11/2003 | Hamel |
| 2003/0220935 A1 | 11/2003 | Vivian et al. |
| 2004/0006723 A1 | 1/2004 | Erstad |
| 2004/0030954 A1 | 2/2004 | Loaiza et al. |
| 2004/0031030 A1 | 2/2004 | Kidder et al. |
| 2004/0034669 A1 | 2/2004 | Smith et al. |
| 2004/0054643 A1 | 3/2004 | Vemuri et al. |
| 2004/0064639 A1 | 4/2004 | Sicola et al. |
| 2004/0068627 A1 | 4/2004 | Sechrest et al. |
| 2004/0083345 A1 | 4/2004 | Kim et al. |
| 2004/0088301 A1 | 5/2004 | Mahalingam et al. |
| 2004/0093474 A1 | 5/2004 | Lin et al. |
| 2004/0098547 A1 | 5/2004 | Ofek et al. |
| 2004/0107226 A1 | 6/2004 | Autrey et al. |
| 2004/0117437 A1 | 6/2004 | Frank |
| 2004/0117438 A1 | 6/2004 | Considine et al. |
| 2004/0139128 A1 | 7/2004 | Becker et al. |
| 2004/0167943 A1 | 8/2004 | Margolus |
| 2004/0172574 A1 | 9/2004 | Wing et al. |
| 2004/0190459 A1 | 9/2004 | Ueda et al. |
| 2004/0199515 A1 | 10/2004 | Penny et al. |
| 2004/0199549 A1 | 10/2004 | Oksanen |
| 2004/0205312 A1 | 10/2004 | Zlotnick et al. |
| 2004/0205390 A1 | 10/2004 | Kanevsky et al. |
| 2004/0210608 A1 | 10/2004 | Lee et al. |
| 2004/0220961 A1 | 11/2004 | Lee et al. |
| 2004/0221125 A1 | 11/2004 | Ananthanarayanan et al. |
| 2004/0250021 A1 | 12/2004 | Honda et al. |
| 2004/0260673 A1 | 12/2004 | Hitz et al. |
| 2004/0260678 A1 | 12/2004 | Verbowski et al. |
| 2004/0267828 A1 | 12/2004 | Zwilling et al. |
| 2004/0267835 A1 | 12/2004 | Zwilling et al. |
| 2004/0267836 A1 | 12/2004 | Armangau et al. |
| 2004/0268068 A1 | 12/2004 | Curran et al. |
| 2005/0005066 A1 | 1/2005 | Nakayama et al. |
| 2005/0010835 A1 | 1/2005 | Childs et al. |
| 2005/0015415 A1 | 1/2005 | Grarimella et al. |
| 2005/0015416 A1 | 1/2005 | Yamagami |
| 2005/0021869 A1 | 1/2005 | Aultman et al. |
| 2005/0022213 A1 | 1/2005 | Yamagami |
| 2005/0027749 A1 | 2/2005 | Ohno et al. |
| 2005/0032479 A1 | 2/2005 | Miller et al. |
| 2005/0033930 A1 | 2/2005 | Haruma et al. |
| 2005/0038968 A1 | 2/2005 | Iwamura |
| 2005/0044162 A1 | 2/2005 | Liang et al. |
| 2005/0050110 A1 | 3/2005 | Sawdon et al. |
| 2005/0050386 A1 | 3/2005 | Reinhardt et al. |
| 2005/0055603 A1 | 3/2005 | Soran et al. |
| 2005/0066095 A1 | 3/2005 | Mullick et al. |
| 2005/0071379 A1 | 3/2005 | Kekre et al. |
| 2005/0071390 A1 | 3/2005 | Midgley et al. |
| 2005/0076261 A1 | 4/2005 | Rowan et al. |
| 2005/0081089 A1 | 4/2005 | Hayardeny et al. |
| 2005/0086650 A1 | 4/2005 | Yates et al. |
| 2005/0102547 A1 | 5/2005 | Keeton et al. |
| 2005/0125513 A1 | 6/2005 | Lam et al. |
| 2005/0125573 A1 | 6/2005 | Klein et al. |
| 2005/0131966 A1 | 6/2005 | Lou |
| 2005/0131969 A1 | 6/2005 | Nishigaki |
| 2005/0131990 A1 | 6/2005 | Jewell |
| 2005/0132351 A1 | 6/2005 | Randall et al. |
| 2005/0138081 A1 | 6/2005 | Alshab et al. |
| 2005/0138090 A1 | 6/2005 | Augenstein et al. |
| 2005/0138204 A1 | 6/2005 | Iyer et al. |
| 2005/0182797 A1 | 8/2005 | Adkins et al. |
| 2005/0182953 A1 | 8/2005 | Stager et al. |
| 2005/0188256 A1 | 8/2005 | Stager et al. |
| 2005/0193031 A1 | 9/2005 | Midgley et al. |
| 2005/0195660 A1 | 9/2005 | Kavuri et al. |
| 2005/0198303 A1 | 9/2005 | Knauerhase et al. |
| 2005/0198452 A1 | 9/2005 | Watanabe |
| 2005/0210218 A1 | 9/2005 | Hoogterp |
| 2005/0216527 A1 | 9/2005 | Erlingsson |
| 2005/0216788 A1 | 9/2005 | Mani-Meitav et al. |
| 2005/0223043 A1 | 10/2005 | Randal et al. |
| 2005/0223181 A1 | 10/2005 | Jeppsen et al. |
| 2005/0226059 A1 | 10/2005 | Kavuri et al. |
| 2005/0235016 A1 | 10/2005 | Amano |
| 2005/0240792 A1 | 10/2005 | Sicola et al. |
| 2005/0246311 A1 | 11/2005 | Whelan et al. |
| 2005/0251540 A1 | 11/2005 | Sim-Tang |
| 2005/0257085 A1 | 11/2005 | Haustein et al. |
| 2005/0262097 A1 | 11/2005 | Sim-Tang et al. |
| 2005/0262377 A1 | 11/2005 | Sim-Tang |
| 2005/0267916 A1 | 12/2005 | Tone et al. |
| 2005/0267920 A1 | 12/2005 | Helliker et al. |
| 2006/0010227 A1 | 1/2006 | Atluri et al. |
| 2006/0020572 A1 | 1/2006 | Ishii et al. |
| 2006/0031468 A1 | 2/2006 | Atluri et al. |
| 2006/0041602 A1 | 2/2006 | Lomet et al. |
| 2006/0047714 A1 | 3/2006 | Anderson et al. |
| 2006/0047895 A1 | 3/2006 | Rowan et al. |
| 2006/0047997 A1 | 3/2006 | Anderson et al. |
| 2006/0047999 A1 | 3/2006 | Passerini et al. |
| 2006/0053139 A1 | 3/2006 | Marzinski et al. |
| 2006/0053333 A1 | 3/2006 | Uhlmann et al. |
| 2006/0059209 A1 | 3/2006 | Lashley |
| 2006/0064541 A1 | 3/2006 | Kano |
| 2006/0080362 A1 | 4/2006 | Wagner et al. |
| 2006/0107006 A1 | 5/2006 | Green et al. |
| 2006/0114497 A1 | 6/2006 | Anderson et al. |
| 2006/0133428 A1 | 6/2006 | Guthrie et al. |
| 2006/0149793 A1 | 7/2006 | Kushwah et al. |
| 2006/0149798 A1 | 7/2006 | Yamagami |
| 2006/0155674 A1 | 7/2006 | Traut et al. |
| 2006/0155912 A1 | 7/2006 | Singh et al. |
| 2006/0206536 A1 | 9/2006 | Sawdon et al. |
| 2006/0212481 A1 | 9/2006 | Stacey et al. |
| 2006/0218434 A1 | 9/2006 | Solhjell |
| 2007/0022117 A1 | 1/2007 | Keohane et al. |
| 2007/0033356 A1 | 2/2007 | Erlikhman |

(56) References Cited

U.S. PATENT DOCUMENTS

| | | |
|---|---|---|
| 2007/0038887 A1 | 2/2007 | Witte et al. |
| 2007/0038998 A1 | 2/2007 | Fries |
| 2007/0055833 A1 | 3/2007 | Vu et al. |
| 2007/0101421 A1 | 5/2007 | Wesinger, Jr. et al. |
| 2007/0129953 A1 | 6/2007 | Cunningham et al. |
| 2007/0168404 A1 | 7/2007 | Nakamura et al. |
| 2007/0174669 A1 | 7/2007 | Ebata et al. |
| 2007/0185922 A1 | 8/2007 | Kapoor et al. |
| 2007/0244938 A1 | 10/2007 | Michael |
| 2007/0282921 A1 | 12/2007 | Atluri et al. |
| 2007/0299959 A1 | 12/2007 | Penny et al. |
| 2008/0010411 A1 | 1/2008 | Yang et al. |
| 2008/0046710 A1 | 2/2008 | Maddocks et al. |
| 2008/0134163 A1 | 6/2008 | Golde et al. |
| 2008/0147756 A1 | 6/2008 | Stager et al. |
| 2008/0147821 A1 | 6/2008 | Dietrich et al. |
| 2008/0162590 A1* | 7/2008 | Kundu ................ G06F 11/1471 |
| 2008/0201390 A1 | 8/2008 | Anguelov |
| 2008/0208933 A1 | 8/2008 | Lyon |
| 2008/0250198 A1 | 10/2008 | Purchase et al. |
| 2009/0019308 A1 | 1/2009 | Amano |
| 2009/0070627 A1 | 3/2009 | Lohn et al. |
| 2009/0150906 A1 | 6/2009 | Schmidt et al. |
| 2009/0177718 A1 | 7/2009 | Patterson et al. |
| 2009/0228645 A1 | 9/2009 | Kitamura |
| 2009/0300412 A1 | 12/2009 | Soran et al. |
| 2010/0205231 A1 | 8/2010 | Cousins |
| 2010/0269146 A1 | 10/2010 | Britt |
| 2011/0078119 A1 | 3/2011 | Soran et al. |
| 2011/0161295 A1* | 6/2011 | Ngo ................ G06F 17/30551 707/639 |
| 2011/0258385 A1 | 10/2011 | Soran et al. |
| 2012/0101997 A1 | 4/2012 | Zwilling et al. |
| 2012/0102001 A1* | 4/2012 | Longshaw .......... G06F 11/1471 707/662 |
| 2012/0124006 A1 | 5/2012 | Zizys et al. |
| 2012/0173673 A1 | 7/2012 | Dietrich et al. |
| 2013/0085994 A1 | 4/2013 | Michael et al. |
| 2014/0108348 A1* | 4/2014 | Ahrens ............. G06F 17/30174 707/639 |
| 2014/0279907 A1 | 9/2014 | Koza et al. |
| 2014/0279930 A1 | 9/2014 | Gupta et al. |
| 2014/0279931 A1 | 9/2014 | Gupta et al. |

OTHER PUBLICATIONS

SAP HANA Disaster Recovery Support, Retrieved on: Sep. 29, 2014, Available at: http://help.sap.com/saphelp_hanaplatform/helpdata/en/b7/4e16a9e09541749a745f41246a065e/frameset.htm.
Point-In-Time recovery, Retrieved on: Sep. 29, 2014, Available at: http://www.percona.com/doc/percona-xtrabackup/1.6/innobackupex/pit_recovery_ibk.html.
"International Search Report and Written Opinion Issued in PCT Application No. PCT/US2015/057275", Mailed Date: Mar. 2, 2016, 17 Pages.
"International Search Report for PCT/US04/24048" mailed date: May 31, 2005.
Al-Kateb, "CME: A Temporal Relational Model for Efficient Coalescing," 2005, IEEE Xplore, p. 83-90.
Bhattacharya et al., Coordinating Backup/Recovery and Data Consistency Between Database and File Systems, ACM SIGMOD'2002, Jun. 4-6, 2002, pp. 500-511.
Ceri et al., "Independent Updates and Incremental Agreement in Replicated Databases," Distributed and Parallel Databases, vol. 2, No. 3, 1995 (pp. 225-246).
Chervenak et al., "Protecting File Systems: A Survey of Backup Techniques," GA Tech University, pp. 17-32.
Chuang-Hue Moh, "A Snapshot Utility for a Distributed Object-Oriented Database System," MIT Laboratory for Computer Science, Aug. 14, 2002, pp. 1-19.
Data Protection—Perform Zero Downtime Backups [Online Jan. 29, 2009]. Retrieved from the Internet URL: http://stage.hp.resource.com/sbso/bus_protect/data_protect/zero_downtime.
Doherty, "Database Systems Management and Oracle8," Proceeding SIGMOD '98 Proceedings of the 1998 ACM SIGMOD International Conference on Management of Data—SIGMOD '98, Seattle, WA, vol. 27, Issue 2, Jun. 1998, pp. 510-511.
Elnozahy et al., "A Survey of Rollback-Recovery Protocols in Message-Passing Systems," ACM Computing Surveys, Sep. 2002, 34(3), 375-408.
Gao et al., "Visibility Culling for Time-Varying Volume Rendering Using Temporal Occlusion Coherence," 2004, IEEE Xplore, pp. 147-154.
Gladney, "Data Replicas in Distributed Information Services," ACM Transactions on Database Systems, Mar. 1989, pp. 75-97, vol. 14, No. 1.
HP Open View Storage Data Protector 5.1 Software [online] Retrieved on Jan. 29, 2009 from Internet URL: http://www.hp.com/products1/storage/pdfs/media/OVDPds2.pdf.
Lahiri et al., "Fast-Start: Quick Fault Recovery in Oracle," Proceedings of the 2001 ACM SIGMOD, International Conference on Management of Data, vol. 30, Issue 2, Jun. 2001 (pp. 593-598).
Lindsay, et al., "A Snapshot Differential Refresh Algorithm," Proceedings of the 1986 ACM SIGMOD International Conference on Management of Data, 1986, pp. 53-60, vol. 15, Issue 2.
Mohan et al., "ARIES: A Transaction Recovery Method Supporting Fine-Granularity Locking and Partial Rollbacks Using Write-Ahead Logging," ACM Transactions on Database Systems, 1992, 17(1), 94-162.
Neel, D., "Symantec Says It'll Put Data on Road to Recovery—New LiveState Une Promises Complete System Restoration," Computer Reseller News, Oct. 4, 2004, 12.
Storagecraft Technology Corporation: Protecting Windows Servers and PCs with Fast and Reliable Online Backup and Bare Metal Recovery Solutions.
"Second Written Opinion Issued in PCT Application No. PCT/US2015/057275", Mailed Date: May 12, 2016, 13 Pages.
U.S. Appl. No. 10/833,541, mailed Feb. 1, 2005, Final Office Action.
U.S. Appl. No. 10/883,541, mailed Aug. 10, 2005, Final Office Action.
U.S. Appl. No. 10/883,541, mailed Jan. 24, 2006, Office Action.
U.S. Appl. No. 10/883,541, mailed Jun. 5, 2006, Final Office Action.
U.S. Appl. No. 10/883,541, mailed Jun. 14, 2007, Office Action.
U.S. Appl. No. 11/099,021, mailed Aug. 7, 2007, Office Action.
U.S. Appl. No. 10/833,541, mailed Nov. 30, 2007, Final Office Action.
U.S. Appl. No. 11/099,021, mailed Jan. 24, 2008, Final Office Action.
U.S. Appl. No. 11/438,036, mailed Feb. 15, 2008, Office Action.
U.S. Appl. No. 10/859,368, mailed Feb. 19, 2008, Office Action.
U.S. Appl. No. 11/438,401, mailed May 21, 2008, Office Action.
U.S. Appl. No. 11/099,021, mailed Sep. 22, 2008, Office Action.
U.S. Appl. No. 10/859,368, mailed Oct. 14, 2008, Office Action.
U.S. Appl. No. 11/438,036, mailed Oct. 16, 2008, Office Action.
U.S. Appl. No. 11/438,401, mailed Nov. 26, 2008, Office Action.
U.S. Appl. No. 11/229,289, mailed Feb. 2, 2009, Office Action.
U.S. Appl. No. 11/099,021, mailed Mar. 20, 2009, Final Office Action.
U.S. Appl. No. 11/438,036, mailed Mar. 24, 2009, Office Action.
U.S. Appl. No. 11/229,289, mailed Jul. 27, 2009, Office Action.
U.S. Appl. No. 11/438,401, mailed Aug. 5, 2009, Final Office Action.
U.S. Appl. No. 11/099,021, mailed Oct. 2, 2009, Office Action.
U.S. Appl. No. 11/229,289, mailed Oct. 15, 2009, Office Action.
U.S. Appl. No. 11/438,036, mailed Oct. 19, 2009, Office Action.
U.S. Appl. No. 11/438,401, mailed Oct. 22, 2009, Notice of Allowance.
U.S. Appl. No. 10/859,368, mailed Dec. 2, 2009, Notice of Allowance.
U.S. Appl. No. 11/099,021, mailed May 21, 2010, Final Office Action.
U.S. Appl. No. 11/229,289, mailed Jun. 11, 2010, Office Action.
U.S. Appl. No. 11/099,021, mailed Jul. 22, 2010, Notice of Allowance.
U.S. Appl. No. 11/438,036, mailed Aug. 19, 2010, Office Action.

(56) References Cited

OTHER PUBLICATIONS

U.S. Appl. No. 12/344,320, mailed Sep. 7, 2010, Office Action.
U.S. Appl. No. 11/229,289, mailed Oct. 18, 2010, Office Action.
U.S. Appl. No. 12/344,320, mailed Jan. 13, 2011, Office Action.
U.S. Appl. No. 11/229,289, mailed Feb. 3, 2011, Office Action.
U.S. Appl. No. 12/344,315, mailed Mar. 14, 2011, Office Action.
U.S. Appl. No. 12/186,636, mailed Mar. 24, 2011, Notice of Allowance.
U.S. Appl. No. 12/344,335, mailed Apr. 4, 2011, Office Action.
U.S. Appl. No. 12/344,345, mailed Apr. 12, 2011, Office Action.
U.S. Appl. No. 12/344,311, mailed Jun. 23, 2011, Office Action.
U.S. Appl. No. 11/229,289, mailed Jun. 24, 2011, Notice of Allowance.
U.S. Appl. No. 12/344,315, mailed Jul. 18, 2011, Notice of Allowance.
U.S. Appl. No. 12/344,323, mailed Sep. 15, 2011, Office Action.
U.S. Appl. No. 10/833,541, mailed Sep. 16, 2011, Notice of Allowance.
U.S. Appl. No. 12/344,319, mailed Sep. 21, 2011, Office Action.
U.S. Appl. No. 12/344,345, mailed Sep. 27, 2011, Final Office Action.
U.S. Appl. No. 12/344,364, mailed Oct. 7, 2011, Office Action.
U.S. Appl. No. 11/438,036, mailed Oct. 13, 2011, Office Action.
U.S. Appl. No. 12/344,335, mailed Oct. 28, 2011, Final Office Action.
U.S. Appl. No. 12/508,633, mailed Sep. 21, 2011, Office Action.
U.S. Appl. No. 12/344,311, mailed Dec. 7, 2011, Office Action.
U.S. Appl. No. 12/508,633, mailed Jan. 12, 2012, Final Office Action.
U.S. Appl. No. 11/438,036, mailed Jan. 30, 2012, Office Action.
U.S. Appl. No. 12/344,319, mailed Feb. 10, 2012, Office Action.
U.S. Appl. No. 12/344,323, mailed Feb. 10, 2012, Office Action.
U.S. Appl. No. 12/691,745, mailed Feb. 15, 2012, Office Action.
U.S. Appl. No. 12/344,364, mailed Feb. 24, 2012, Final Office Action.
U.S. Appl. No. 12/344,311, mailed Mar. 5, 2012, Notice of Allowance.
U.S. Appl. No. 12/344,345, mailed Mar. 27, 2012, Office Action.
U.S. Appl. No. 12/691,745, mailed May 23, 2012, Final Office Action.
U.S. Appl. No. 13/339,077, mailed Jun. 21, 2012, Office Action.
U.S. Appl. No. 12/344,335, mailed Jul. 12, 2012, Office Action.
U.S. Appl. No. 12/344,345, mailed Sep. 7, 2012, Final Office Action.
U.S. Appl. No. 13/339,077, mailed Nov. 30, 2012, Office Action.
U.S. Appl. No. 12/344,335, mailed Jan. 22, 2013, Final Office Action.
U.S. Appl. No. 12/344,319, mailed Apr. 25, 2013, Office Action.
U.S. Appl. No. 13/339,077, mailed Apr. 26, 2013, Notice of Allowance.
U.S. Appl. No. 12/344,364, mailed May 1, 2013, Notice of Allowance.
U.S. Appl. No. 12/344,345, mailed May 2, 2013, Notice of Allowance.
U.S. Appl. No. 12/344,323, mailed Jun. 5, 2013, Office Action.
U.S. Appl. No. 12/691,745, mailed Jun. 17, 2013, Office Action.
U.S. Appl. No. 11/438,036, mailed Jul. 24, 2013, Office Action.
U.S. Appl. No. 12/344,319, mailed Jul. 31, 2013, Notice of Allowance.
U.S. Appl. No. 12/508,633, mailed Sep. 26, 2013, Office Action.
U.S. Appl. No. 12/344,323, mailed Oct. 11, 2013, Notice of Allowance.
U.S. Appl. No. 12/691,745, mailed Oct. 22, 2013, Final Office Action.
U.S. Appl. No. 11/438,036, mailed Jan. 16, 2014, Office Action.
U.S. Appl. No. 12/508,633, mailed Jan. 21, 2014, Final Office Action.
U.S. Appl. No. 12/691,745, mailed Jan. 27, 2014, Notice of Allowance.
U.S. Appl. No. 12/344,335, mailed Feb. 13, 2014, Office Action.
U.S. Appl. No. 12/508,633, mailed Mar. 18, 2014, Final Office Action.
U.S. Appl. No. 12/344,320, mailed Apr. 23, 2014, Office Action.
U.S. Appl. No. 12/344,335, mailed May 14, 2014, Notice of Allowance.
U.S. Appl. No. 12/508,633, mailed Jul. 9, 2014, Final Office Action.
U.S. Appl. No. 11/438,036, mailed Jul. 28, 2014, Notice of Allowance.
U.S. Appl. No. 12/508,633, mailed Sep. 26, 2014, Notice of Allowance.
U.S. Appl. No. 12/344,320, mailed Oct. 29, 2014, Office Action.
U.S. Appl. No. 14/496,293, mailed Mar. 31, 2015, Notice of Allowance.
U.S. Appl. No. 12/344,320, mailed Aug. 6, 2015, Notice of Allowance.
"International Preliminary Report on Patentability Issued in PCT Application No. PCT/US2015/057275", Mailed Date: Aug. 9, 2016, 13 Pages.

* cited by examiner

POINT IN TIME DATABASE RESTORE FROM STORAGE SNAPSHOTS

BACKGROUND AND RELEVANT ART

Backups of very large databases have limitations in that they require a large movement of data from the database files to backup media. In a cloud environment, that may mean moving data from cloud storage to a virtual machine and back to cloud storage, crossing expensive boundaries. Storage system snapshots have helped this by providing a metadata-only mechanism to achieve an image of the storage at that point in time. However, this has had the disadvantage that such backups cannot restore the database to an arbitrary point in time between snapshot backups. Rather, the backup is only restored to the point of the snapshot, and any changes to the database after the backup are lost.

Other solutions have relied on streaming backups, which suffer from the data movement problem, or they rely completely on snapshots, which give the ability to restore only to the discrete times when the snapshot is taken.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a system for archiving a database to allow for point in time recovery of the database. The system includes a database. The database includes data storage for storing data items and log storage for storing log records. The system further includes one or more processors and one or more computer readable media. The one or more computer readable media include computer executable instructions that when executed by at least one of the one or more processors cause at least one of the one or more processors to perform various actions of a method. The method includes taking a first snapshot of the data storage of the database at a first time. The method further includes capturing a first state of the log storage corresponding to the first snapshot of the data storage of the database. The log storage comprises an enumeration of operations on the data storage of the database. The method further includes taking a second snapshot of the data storage of the database at a second subsequent time. The method further includes capturing a second state of the log corresponding to the second snapshot of the database. The second state of the log includes all log records occurring after the time of the first snapshot of the database to the time of the second snapshot of the database. The method further includes restoring the database to a particular point between the first time and the second time by applying the first snapshot of the data in data storage to the database, applying the captured first state of the log corresponding to the first snapshot of the log to the database and applying a portion of the second state of the log to perform a point in time recovery between the first time and the second time.

Another embodiment illustrated herein includes a system for archiving a database to allow for point in time recovery of the database. The system includes a database. The database includes data storage for storing data items and log storage for storing log records. The system further includes one or more processors and one or more computer readable media. The one or more computer readable media include computer executable instructions that when executed by at least one of the one or more processors cause a method to be performed. The method includes taking a first snapshot of a database at a first time. The first snapshot of the database includes a first snapshot of the data in the data storage of the database and a first snapshot of the log records in the log storage. The log comprises an enumeration of operations on the database. The method further includes taking a second snapshot of the database at a second subsequent time. The second snapshot of the database includes a second snapshot of the data in data storage of the database and a second snapshot of the log records in the log storage. The second snapshot of the log records in the log storage is a snapshot of all log records after the time of the first snapshot of the database to the time of the second snapshot of the database. The method further includes restoring the database to a particular point between the first time and the second time by applying the first snapshot of the data in the data storage to the database, applying the first snapshot of the log records in the log storage to the database and applying a portion of the second snapshot of the log records in the log storage to the database to perform a point in time recovery between the first time and the second subsequent time.

Another embodiment illustrated herein includes a system for archiving a database to allow for point in time recovery of the database. The system includes a database. The database includes data storage for storing data items and log storage for storing log records. The system further includes one or more processors and one or more computer readable media. The one or more computer readable media include computer executable instructions that when executed by at least one of the one or more processors cause a method to be performed. The method includes taking a first snapshot of a database at a first time. The first snapshot of the database includes a first snapshot of the data in the data storage of the database and a first snapshot of the log records in the log storage. The log comprises an enumeration of operations on the database. The method further includes taking one or more additional snapshots of the database at one or more times respectively subsequent to the first time. The one or more additional snapshots of the database include additional snapshots of the data storage in the database and one or more additional snapshots of the log storage respectively. For each additional snapshot of the data storage in the database, the corresponding snapshot of the log storage is a snapshot of all log records occurring after the time of the additional snapshot of the database to the time of a most recent previous snapshot of the database. The method further includes restoring the database to a particular point between a last occurring subsequent snapshot of the database and a most recent snapshot of the database occurring prior to the last occurring subsequent snapshot of the database by applying the first snapshot of the data in the data storage to the database, applying the first snapshot of the log records in the log storage to the database and applying and log records from the one or more additional snapshots of the log storage to the database to perform a point in time recovery.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein use a snapshot infrastructure to eliminate data movement during a backup stage, but enable the user to restore to an arbitrary point in time between two adjacent snapshots, without requiring streaming transaction log backups. This can be accomplished by laying down the database files from a first snapshot in sequence, and then using only the active transaction log data from a second snapshot to roll the newly restored database forward in time to the point that the user desires. The transaction log for each snapshot is an enumeration of operations performed on the database from the most recent snapshot to the current snapshot which includes the snapshot of the transaction log.

Snapshots of the database can be created periodically using the snapshot infrastructure provided by the storage. The snapshot will require no data movement but just some metadata updates in the storage layer. The snapshots are treated as the backups of the database.

To restore to any point in time desired, two consecutive snapshots (a first snapshot and a second snapshot) enclosing the time can be first identified. Then both the data and log records from the first snapshot can be copied to become the files of the database to be restored. The database can start recovery by applying the log records of the first snapshot to update the data which has not yet been written to the data file. After applying the last log record from the first snapshot, the recovery is paused. After that, only the log portion from the second snapshot is copied to the restoring database's log storage. The snapshot portion of the data from the second snapshot is discarded. Recovery can identify where it stopped in the log previously from the first snapshot and resume to scan the new log records from the second snapshot and start applying them one by one until it reaches the log record that has passed the time a user has identified as the stop time. The remaining log records from the second snapshot can be wiped out by zeroing their portion in the file. Finally, the database can be fully recovered by carrying out an undo phase.

Figure 1A:
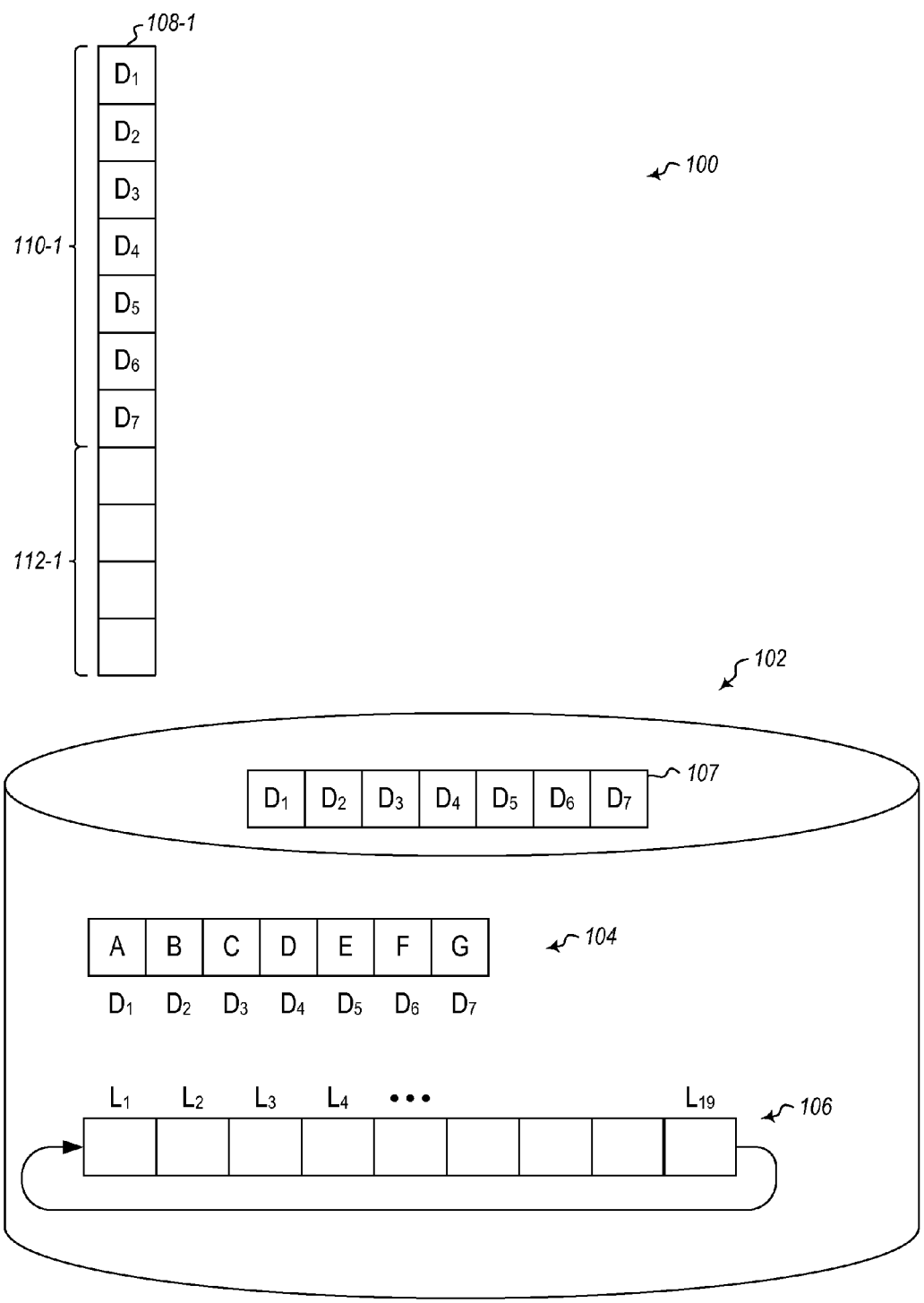
FIG. 1A illustrates a database and a first snapshot of the database.

Referring now to FIG. 1A, a database system 100 that can implement embodiments of the invention is illustrated. The database system includes a database 102. The database 102 includes data storage 104 and log storage 106. The data storage 104 includes the data structure and values that make up the database. In this current example, a single row of data records are shown, but it should be appreciated that the data storage 104 may represent one or more tables or other complex database structures.

Further, while the database 102 is illustrated in a way that would appear to be a single entity at a single location, the database 102 is often distributed across storage devices and often times across different machines in different locations. That is, the database 102 may be a distributed database with different portions of the database residing in different locations. Often, such databases are implemented in a cloud environment where the different portions of the database are hosted by different virtual machines in the cloud environment.

Figure 1B:
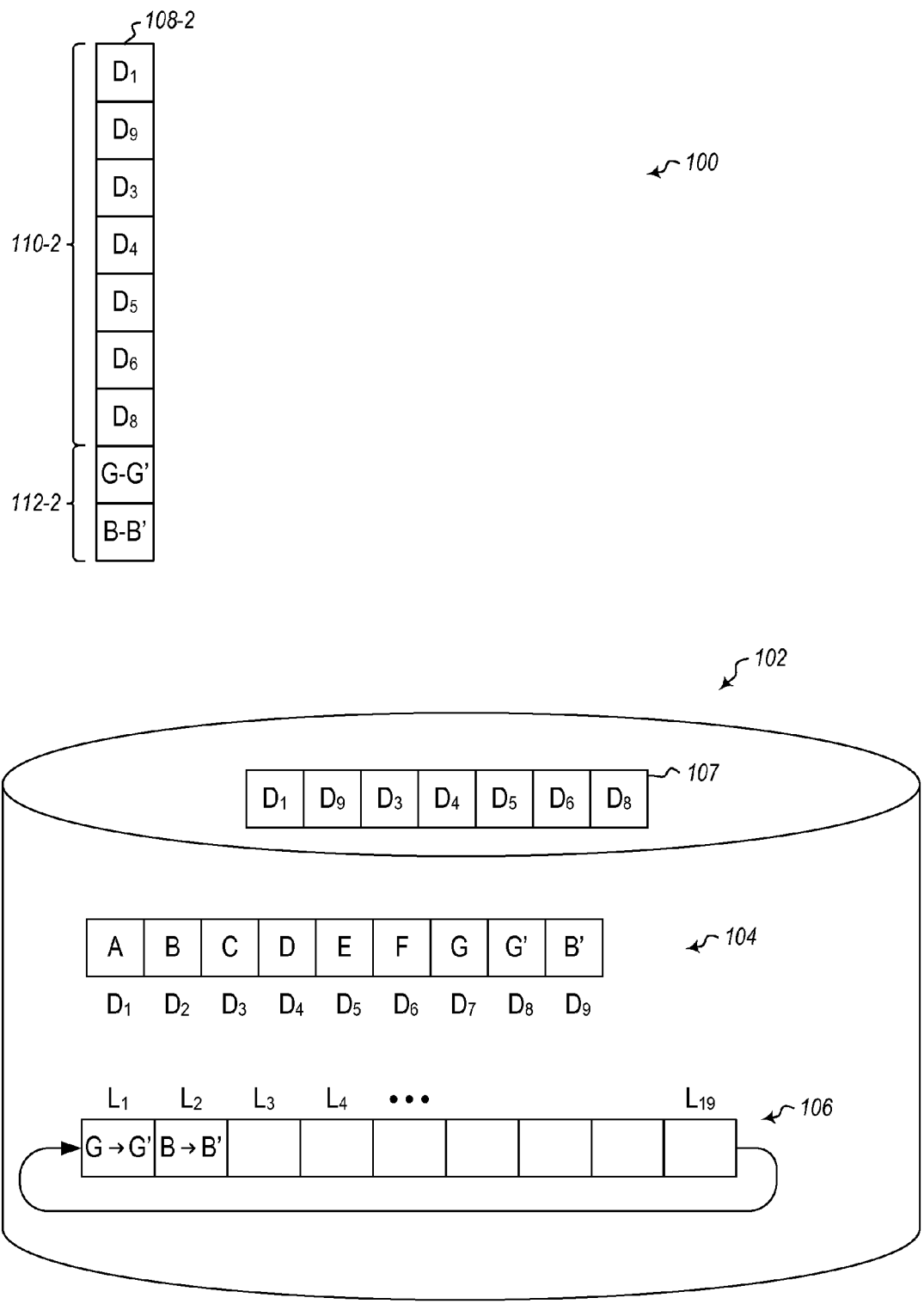
FIG. 1B illustrates the database and a second snapshot of the database.

A database will often include several different versions of a data item to allow the database to be rolled back as a result of transaction failures or for other reasons that may cause a versioned database to be useful. For example, as illustrated in FIG. 1B, which shows the database 102 at a subsequent time to that of FIG. 1A, the data storage 104 includes a data item G at location $D_7$ in the data storage 104. The data storage 104 also includes a data item G', that is a new version of data item G, at location $D_8$ of the data storage 104. The log storage 106 memorializes this change. For example, at location $L_1$ of the log storage 106, the operation change G to G' is memorialized. Thus, the log storage 106 stores a list of operations performed on the data storage 104.

The log storage 106, in the illustrated example, is a circular ring buffer with n records (i.e. from location $L_1$ to location $L_n$). Note that the size may be dynamic if there is a need to grow the size of the log storage 106 to ensure that records are not lost before they are snapshotted as will be explained in more detail below. Due to the ring buffer nature of the log storage, operations will be memorialized in log storage 106. Once an operation has been snapshotted, the location of that record will be marked as overwritable such that new records can be written into that location. Thus, for example, log records may be made into locations $L_1$, $L_2$, and $L_3$ of the log storage. These may be snapshotted as part of a snapshot operation for the database 102, as will be illustrated below. Once they are snapshotted, they can be marked as available for new log records. As changes are made to the database 102 (and in particular the data storage 104) new records will be made to the log storage 106. Once a record is made at log storage location $L_n$, so long as $L_1$ has been marked as overwritable, the next log record will be made at $L_1$ overwriting the record that previously existed there.

If however, $L_1$ is not marked as overwritable, the log storage 106 can be expanded to accommodate the additional log records. However, it is preferable that the log storage 106 be of a somewhat limited size and not expand. This can be achieved by adjusting the frequency or time of snapshots as will be illustrated below.

The database 102 also includes a mapping structure 107. The mapping structure 107 contains a set of pointers to storage locations. The mapping structure 107, at any given time, represents the state of the data in the database at that time. In particular, the mapping structure 107 will point to the storage location, and thus the data, that is current in the database 102.

The database 102 can be backed up by creating snapshots of the database. The snapshots of the database 102 do not store the actual data from the data storage 104, but rather store pointers to records in the data storage 104. Thus, for example, a data portion of a snapshot will be a snapshot at a particular time of the mapping structure 107 at that time. The snapshots can also store log operations from the log storage 106. Once log operations from the log storage 106 have been snapshotted, then the storage locations for those snapshotted operations can be marked as free or overwritable.

Figure 1C:
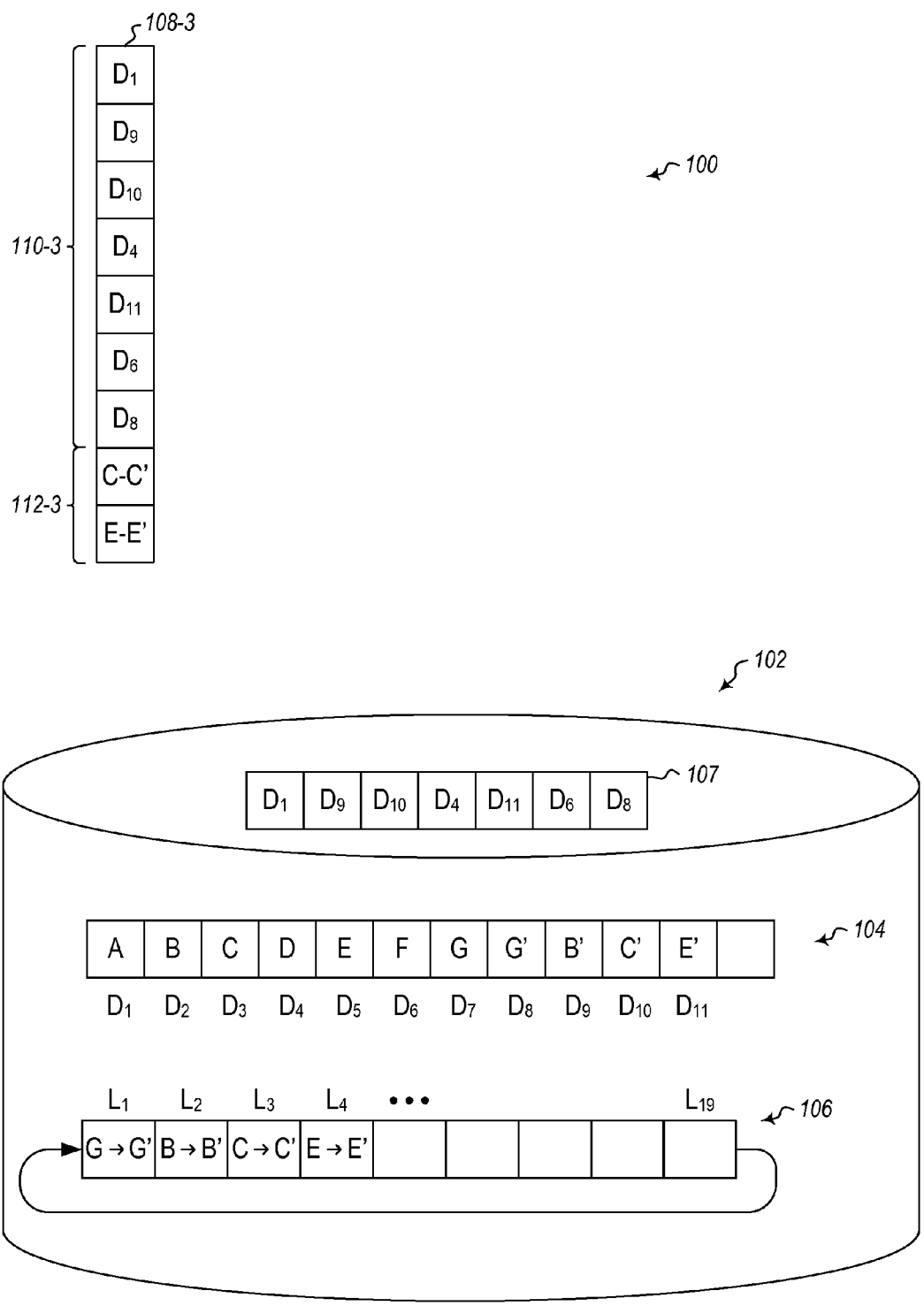
FIG. 1C illustrates the database and a third snapshot of the database.

FIGS. 1A, 1B and 1C illustrate a set of three snapshots 108-1, 108-2 and 108-3. The three snapshots represent a sequence of adjacent (in time) snapshots (with snapshot 108-1 being first in time, snapshot 108-2 being second in time, and snapshot 108-3 being third in time), meaning that there are no additional snapshots intervening between any of the three snapshots. As illustrated, the snapshots do not include data from the data storage 104, but rather include pointers to storage locations in the data storage 104. Thus, for example, snapshot 108-1 includes a data portion 110-1 with pointers to locations $D_1$, $D_2$, $D_3$, $D_4$, $D_5$, $D_6$ and $D_7$. Snapshot 108-1 also includes a log portion 112-1. However, the log portion 112-1 is not shown with any records as, either there are none, or while they may exist in actual embodiments, and that existence is significant, the particular values in those recorded values are not needed for the present illustration.

The snapshot 108-2 in FIG. 1B is taken after changes are made to the data storage 104 and records are added to the log storage 106. In particular, data item G at data storage location $D_7$ is changed to a new version G' stored at storage location $D_8$. Also, data item B at storage location $D_2$ is changed to a new version B' at data storage location $D_9$. The snapshot 108-2 includes a new mapping with mapping to locations $D_8$ and $D_9$ instead of the mappings to locations $D_7$ and $D_2$ respectively. Thus, the snapshot 108-2 includes a data portion 110-2 with the new mapping, and a log portion 112-1 with the new log records.

The log storage 106 is updated at locations $L_1$ and $L_2$ respectively to memorialize the operations that caused these changes. While simply shown as a change from G→G' or from B→B', it should be appreciated that the log can memorialize details, such as what operation is performed. For example, the actual log record may indicate writing G' to a particular database table location. The log records at locations $L_1$ and $L_2$ are snapshotted as part of the snapshot 108-2. Once the log records have been snapshotted, the log storage locations $L_1$ and $L_2$ can be marked as free or overwritable.

The snapshot 108-3 in FIG. 1C is taken after additional changes are made to the data storage 104 and additional records are added to the log storage 106. In this example, data item C is updated to a new version C', and data item E is updated to a new version E'. This is reflected in the snapshot 108-3 with the pointers to data storage locations D10 and D11 in the data portion 110-3 of the snapshot 108-3. The log portion 112-3 of the snapshot 108-3 includes the log records from location $L_3$ and $L_4$ of the log storage 106. As the locations $L_3$ and $L_4$ of the log storage 106 of the database 102 have been snapshotted, those locations (i.e. $L_3$ and $L_4$) can be marked as free or overwritable. At this point, using the snapshots 108-1 through 108-3, the database can be recovered to any point in time after the time of the first snapshot 108-1 to the time of the third snapshot 108-3.

Figure 2A:
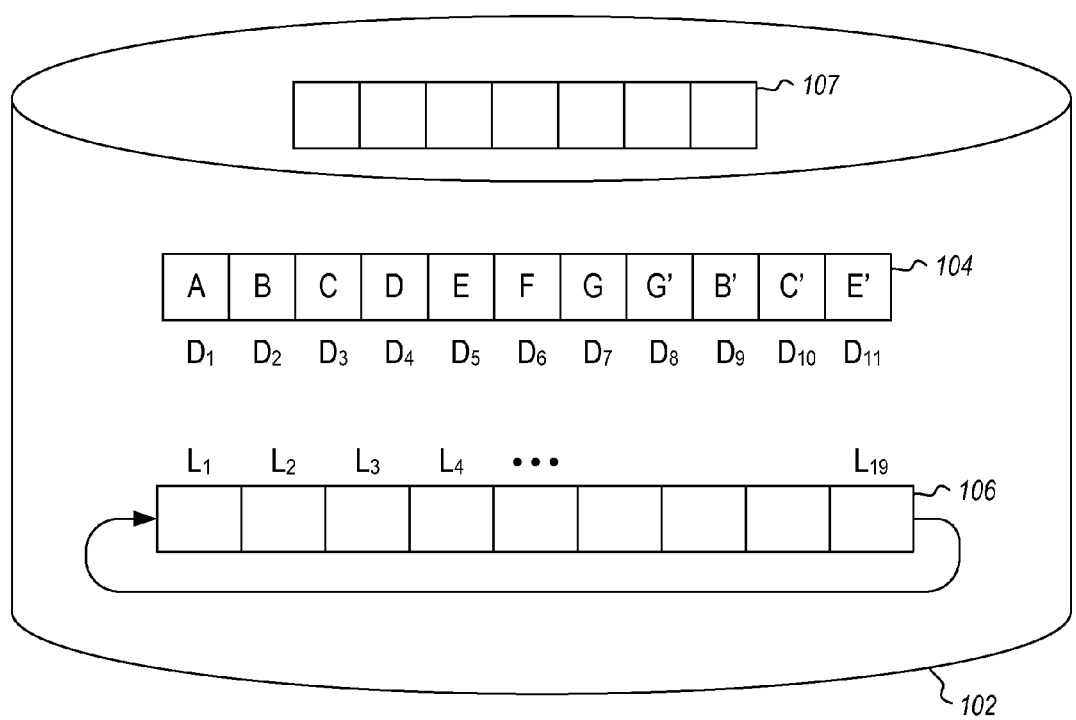
FIG. 2A illustrates the state of a database at a first time during a restore process.
Figure 2B:
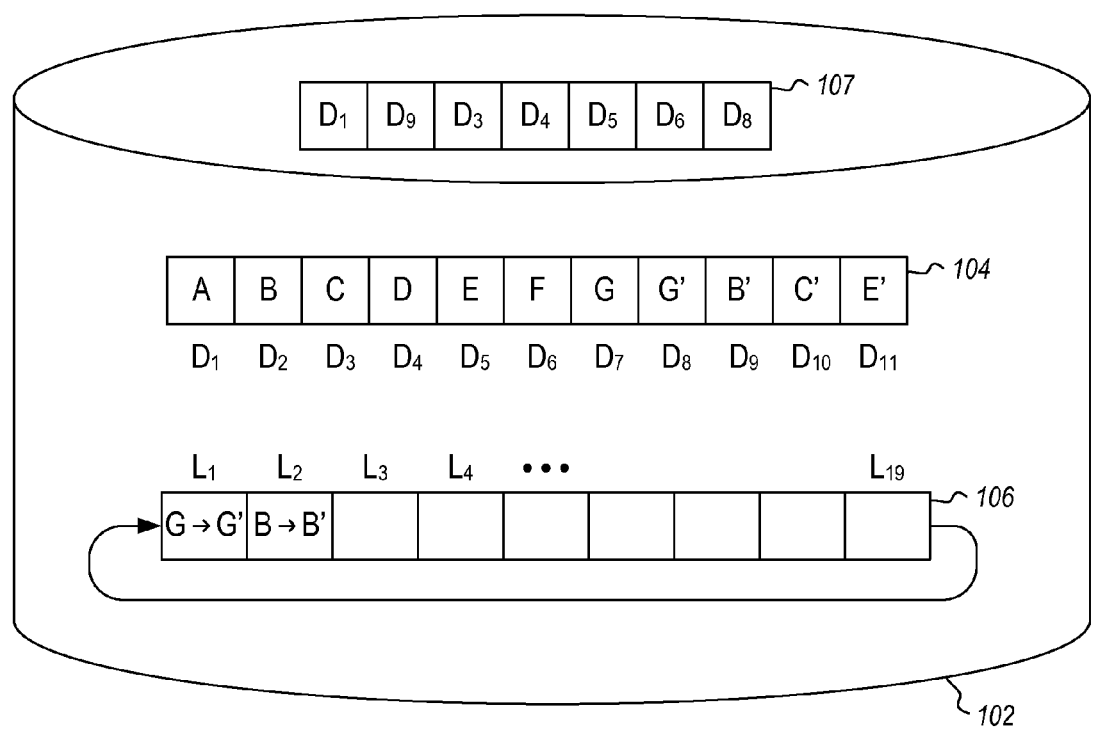
FIG. 2B illustrates the state of a database at a second time during the restore process.
Figure 2C:
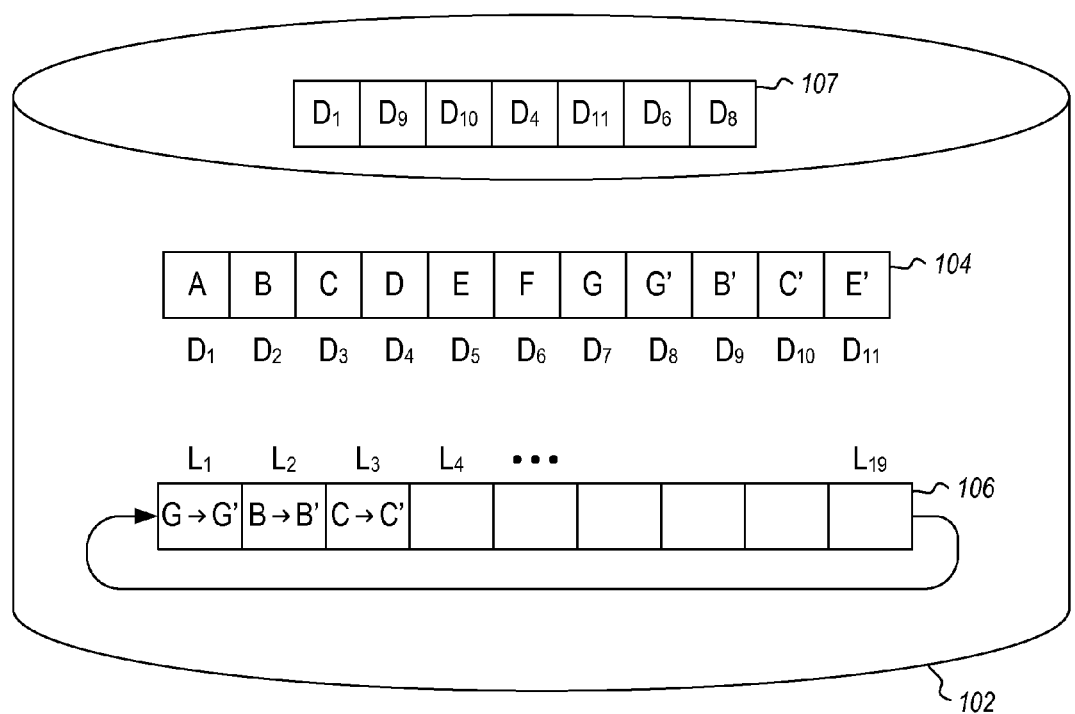
FIG. 2C illustrates the state of a database at a third time during the restore process.

An example of database recovery is illustrated in FIGS. 2A, 2B and 2C. In the example illustrated, the database 102 is recovered at a point between the second snapshot 108-2 and the third snapshot 108-3. In particular, the database is to be restored to the point in time after data item C is updated to C'.

FIG. 2A illustrates the database 102, including the data storage 104 and the log storage 106 at an initial time. To restore the database to the desired point in time, the second snapshot 108-2 and third snapshot 108-3 are identified. The second snapshot 108-2, including the snapshot of the log included in the log portion 112-2 is applied to the database 102. As illustrated in FIG. 2B, this causes the records from the data portion 110-2 of the snapshot 108-2 to be applied to the mapping structure 107 and the records from the log portion 112-2 of the snapshot 108-2 to be applied to the log storage 106.

Then a portion of the log portion 112-3 from the third snapshot 108-3 is applied to the log storage 106 of the database 102 as illustrated in FIG. 2C. In particular, all records in the log portion 112-3 up to and including the operation that updates C to C' are applied to the log storage 106. As such, the database is thereby restored to the point in time when data item C was updated to version C'.

While the casual observer will note that in the Figures, the log records in log storage in FIG. 2C are in the same storage locations (i.e. $L_1$, $L_2$, and $L_3$) as those in FIG. 1, this is purely coincidental. The log records could be restored to any appropriate location in the ring buffer of the log storage 106 that are available for restoring the log records. Alternatively, the log storage 106 can be treated as if all entries are invalid, and the log records can be restored as if the log storage 106 had all storage locations available for writing.

In the example illustrated in FIGS. 2A through 2C, at FIG. 2B, the log records from the second snapshot 108-2 are applied to the log storage 106. However, it should be appreciated that in some situations, those records would not need to be restored. For example, if all changes to the data in the database were made durable (i.e. all transactions are committed or rolled back) prior to the second snapshot 108-2, there may be no need for the log records memorializing the changes from G to G' and from B to B' as they would not be needed to roll back any outstanding transactions. In this case, all that would be needed to restore the database 102 is the data portion 110-2 of the second snapshot 108-2 and the log portion 112-3 of the third snapshot 108-3.

Note that in an alternative embodiment, a database may be restored by using a single data portion obtained from one snapshot and several different log portions obtained from corresponding snapshots. For example, one could restore the database to the point in time where data item C is updated to C' by first applying the data portion 110-1 of the first snapshot 108-1 to the database 102, applying the log portion 112-1 of the first snapshot 108-1 to the log storage 106 of the database 102, applying the log portion 112-2 of the second snapshot 108-2 to the log storage 106 of the database, and finally by applying a portion of the log portion 112-3 to the log storage 106 of the database 102.

The examples illustrated above illustrate snapshots which include both the data portion and log portion. It should be appreciated that these can be obtained in a number of different ways. Further, some embodiments may be implemented where the data portion and the log portion of a snapshot are stored separately. Further, these portions may be obtained through different sets of operations. However even in these cases, the log portion of a snapshot (or a log snapshot corresponding to a data snapshot) generally only includes a memorialization of operations after the most recent previous snapshot of the data to the snapshot to which the log portion belongs. Thus, in most embodiments, the log portion will not include log records occurring before the most recent previous snapshot or log records occurring after the current snapshot. Thus, for example, the log portion 112-2 will typically only include log records occurring after the snapshot 108-1 up to and including the time of the snapshot 108-2. However, in other embodiments, the log portion will include log records occurring before the most recent previous snapshot and/or log records occurring after the current snapshot The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
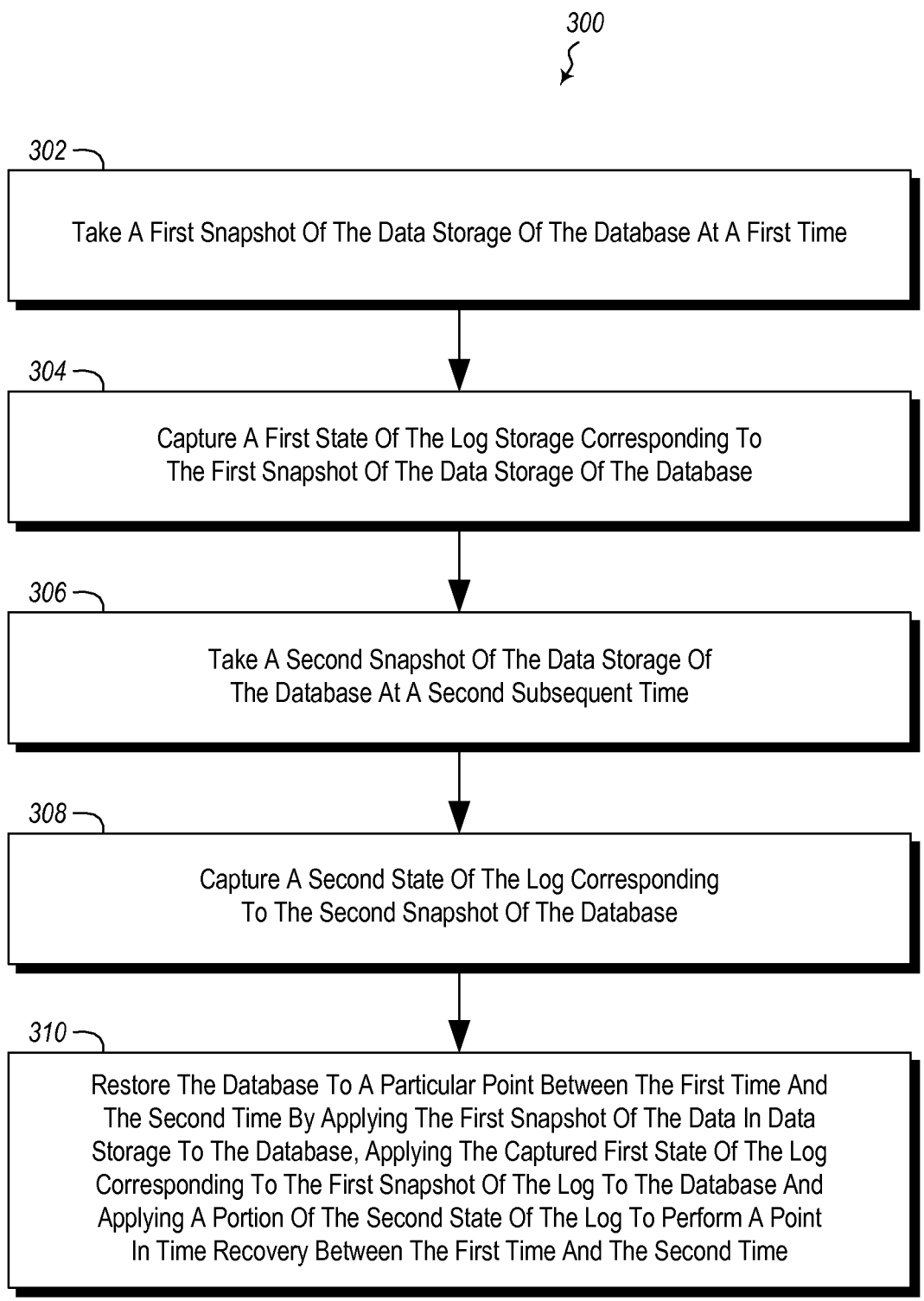
FIG. 3 illustrates a method of archiving and restoring a database.

Referring now to FIG. 3, a method 300 is illustrated. The method 300 includes acts for archiving and restoring a database. The method 300 includes taking a first snapshot of the data storage of the database at a first time (act 302). The method 300 further includes capturing a first state of the log storage corresponding to the first snapshot of the data storage of the database (act 304). The log storage comprises an enumeration of operations on the data storage of the database. For example, FIG. 1A illustrates a snapshot 108-2 taken at a first time. The snapshot 108-2 includes a data portion 110-2 and a log portion 112-2.

The method 300 further includes taking a second snapshot of the data storage of the database at a second subsequent time (act 306). The method 300 further includes capturing a second state of the log corresponding to the second snapshot of the database (act 308). The second state of the log includes all log records occurring after the time of the first snapshot of the database to the time of the second snapshot. For example, FIG. 1B illustrates taking a second snapshot 108-3 with a data portion 110-3 and a log portion 112-3. The log portion includes a memorialization of the log records at location $L_3$ and $L_4$. These records were created after the first snapshot 108-2.

The method 300 further includes restoring the database to a particular point between the first time and the second time by applying the first snapshot of the data in data storage to the database, applying the captured first state of the log corresponding to the first snapshot of the log to the database and applying a portion of the second state of the log to perform a point in time recovery between the first time and the second time (act 310). Thus, as illustrated in FIGS. 2A-2C, the data portion 110-2 and the log portion 112-2 can be applied to the database 102 (as illustrated in FIG. 2B), and then a portion of the log portion 112-3 can be applied as illustrated in FIG. 2C to achieve a point in time recovery.

The method 300 may be practiced where taking a second snapshot of the data storage of the database and capturing the second state of the log corresponding to the second snapshot of the databased is performed in a unified snapshot of the database operation. Thus, for example, the snapshot 108-3 may be taken as a single snapshot or set of snapshot operations to capture both the data portion 110-2 and the log portion 112-2.

Some embodiments may be practiced in a system that includes a data mapping structure (such as the data mapping structure 107). In these embodiments, taking snapshots of the data storage may include capturing pointers in the data mapping structure pointing to locations in the data storage. The snapshots illustrated in FIGS. 1A-1C illustrate such snapshots.

The method 300 may be practiced where capturing a state of the log storage comprises capturing one or more representations of data operations performed on data items in the data storage. Thus for example, the log portion may indicate what operations were performed on particular data items.

Some embodiments may be practiced in a system that is a distributed database implemented in a cloud environment, such that different portions of the database are implemented on different virtual machines in the cloud environment.

Some embodiments may be practiced in a system that where the database is a versioned database storing different versions of data items. Thus, in one example, as illustrated in FIG. 1C, the database contains both old versions and news versions of data items G, B C and E.

Some embodiments may be practiced in a system where the log storage comprises a ring buffer. In such embodiments, the method 300 may further includes causing storage locations in the log storage to be made available, for new records, once existing records in those locations have been captured when capturing a state of the log storage corresponding to a snapshot.

Figure 4:
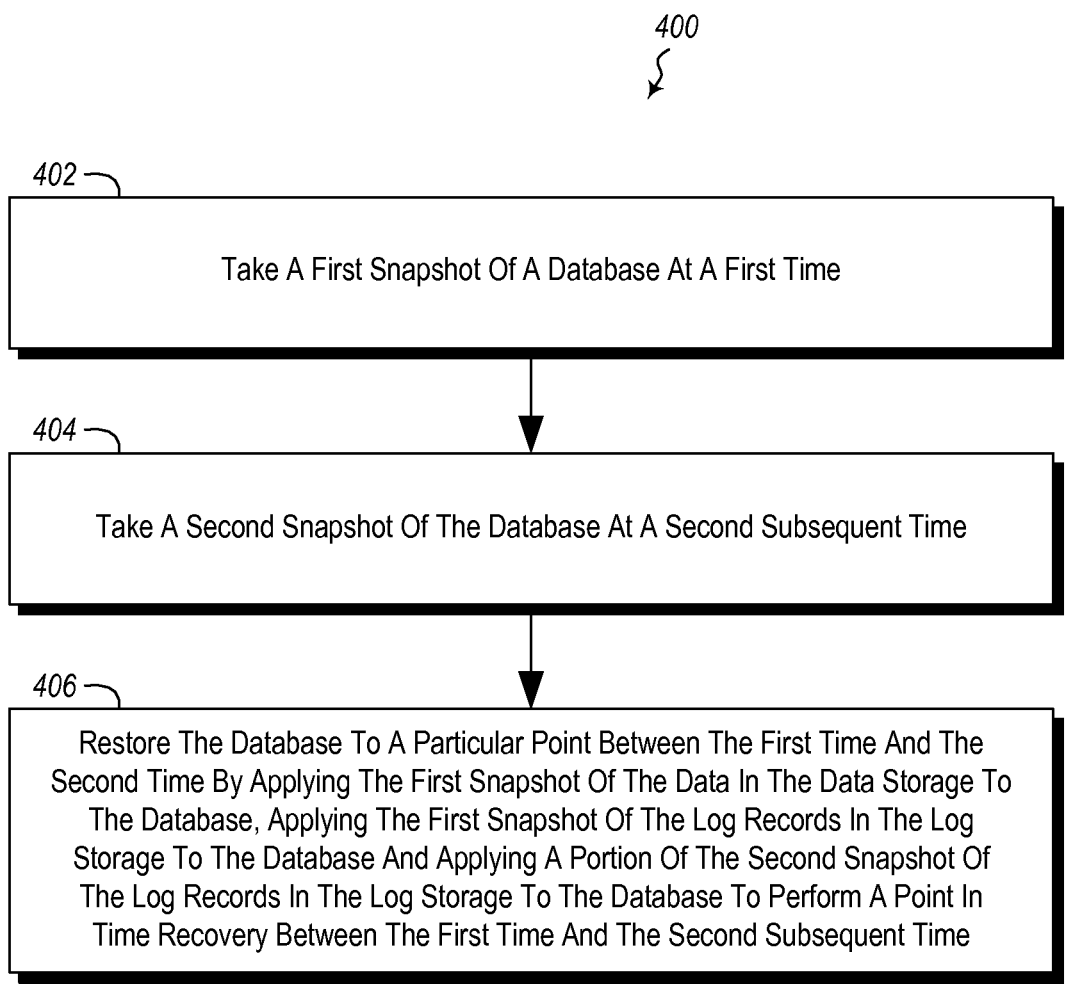
FIG. 4 illustrates another method of archiving and restoring a database.

Referring now to FIG. 4, another method for archiving and restoring a database is illustrated. The method may be practiced in a database environment. The method 400 includes taking a first snapshot of a database at a first time (act 402). The first snapshot of the database includes a first snapshot of the data in the data storage of the database and a first snapshot of the log records in the log storage. The log storage comprises an enumeration of operations on the database;

The method 400 further includes taking a second snapshot of the database at a second subsequent time (act 404). The second snapshot of the database includes a second snapshot of the data in data storage of the database and a second snapshot of the log records in the log storage. The second snapshot of the log records in the log storage is a snapshot of all log records after the time of the first snapshot of the database to the time of the second snapshot of the database.

The method 400 further includes restoring the database to a particular point between the first time and the second time by applying the first snapshot of the data in the data storage to the database, applying the first snapshot of the log records in the log storage to the database and applying a portion of the second snapshot of the log records in the log storage to the database to perform a point in time recovery between the first time and the second subsequent time. An example is illustrated in FIGS. 2A-2C discussed above.

The method may be practiced in a system comprising a data mapping structure. In some such embodiments, taking snapshots of the database comprises capturing pointers in the data mapping structure pointing to locations in the data storage.

The method may be practiced in a system where the log records in the log storage comprise one or more representations of data operations performed on data items in the data storage.

The method may be practiced in a system where the database is a distributed database implemented in a cloud environment, such that different portions of the database are implemented on different virtual machines in the cloud environment.

The method may be practiced in a system where the database is a versioned database storing different versions of data items.

The method may be practiced in a system where the log storage comprises a ring buffer. In some such embodiments, the method 400 may further includes causing storage locations in the log storage to be made available, for new records, once existing records in those locations have been captured during a snapshot.

Figure 5:
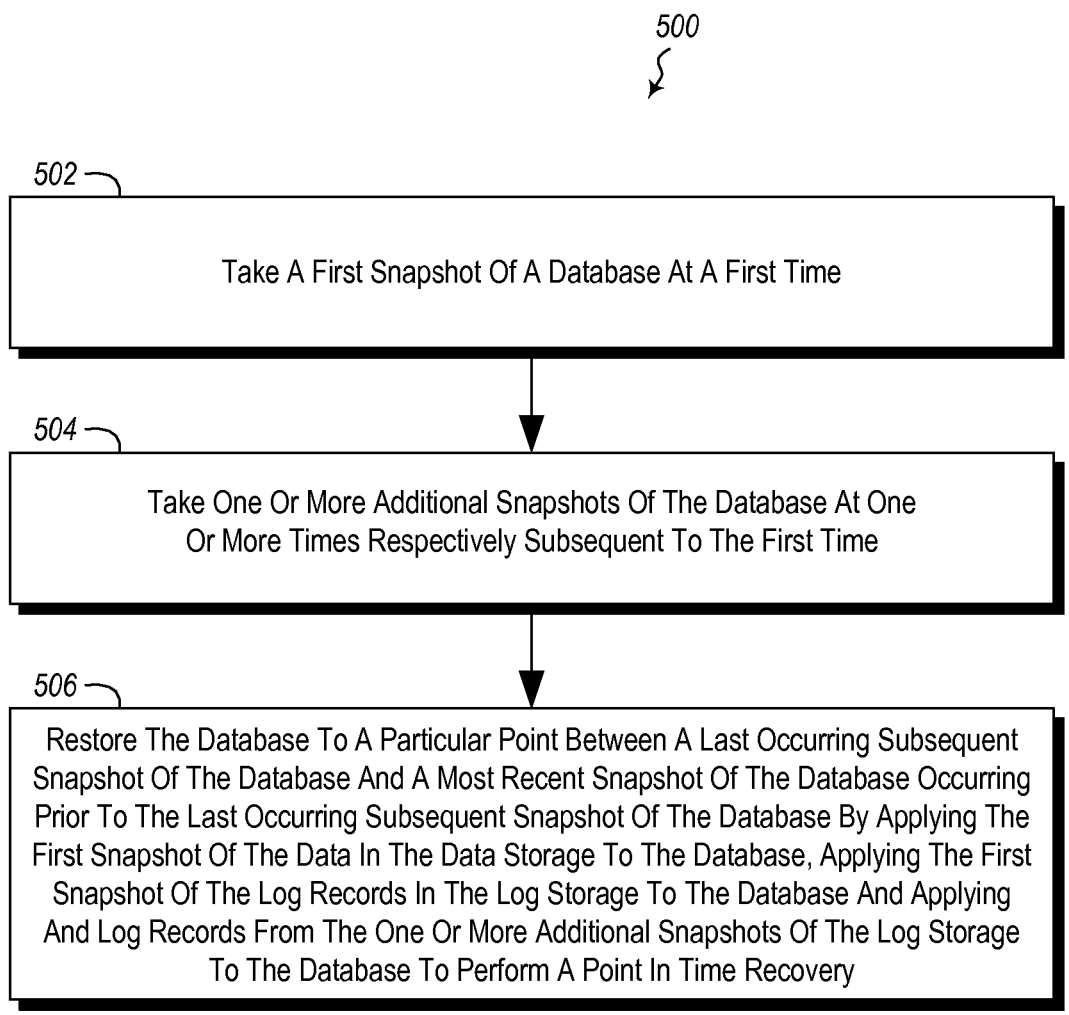
FIG. 5 illustrates another method of archiving and restoring a database.

Referring now to FIG. 5, a method of archiving and restoring a database is illustrated. The method 500 includes taking a first snapshot of a database at a first time (act 502). The first snapshot of the database includes a first snapshot of the data in the data storage of the database and a first snapshot of the log records in the log storage. The log storage comprises an enumeration of operations on the database;

The method 500 further includes taking one or more additional snapshots of the database at one or more times respectively subsequent to the first time (act 504). The one or more additional snapshots of the database include one or more additional snapshots of the data storage in the database and one or more additional snapshots of the log storage respectively. For each additional snapshot of the data storage in the database, the corresponding snapshot of the log storage is a snapshot of all log records occurring after the time of the additional snapshot of the database to the most recent time of a previous snapshot of the database.

The method 500 further includes restoring the database to a particular point between a last occurring subsequent snapshot of the database and a most recent snapshot of the database occurring prior to the last occurring subsequent snapshot of the database by applying the first snapshot of the data in the data storage to the database, applying the first snapshot of the log records in the log storage to the database and applying and log records from the one or more additional snapshots of the log storage to the database to perform a point in time recovery. Thus for example, with reference to the figures, the snapshot 108-1, including the data portion 110-1 and the log portion 112-1 could be applied to the database (such as by applying the data portion 110-1 to the mapping structure 107 and the log portion 112-1 to the log storage 106. The log portion 112-2 of the second snapshot 108-2 could also be applied to the log storage 106. Then, a portion of the log portion 112-3 of the third snapshot 108-3 could be applied to the log storage 106 to perform the point in time recovery.

The method may be practiced in a system comprising a data mapping structure. In some such embodiments, taking snapshots of the database includes capturing pointers in the data mapping structure pointing to locations in the data storage.

The method may be practiced in a system where the log records in the log storage comprise one or more representations of data operations performed on data items in the data storage.

The method may be practiced in a system where the database is a distributed database implemented in a cloud environment, such that different portions of the database are implemented on different virtual machines in the cloud environment.

The method may be practiced in a system where the database is a versioned database storing different versions of data items.

The method may be practiced in a system where the log storage comprises a ring buffer. In some such embodiments, the method 500 may further include causing storage locations in the log storage to be made available, for new records, once existing records in those locations have been captured during a snapshot.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a database, wherein the database comprises:
   data storage for storing data items;
   log storage for storing log records that comprise a list of operations performed on the data storage at discrete points in time; and
   a mapping structure representing state of the data in the database at any given point in time, the mapping structure comprising a set of pointers to storage locations for data as currently stored at the given point in time;
   one or more physical computer storage media comprising computer executable instructions;
   one or more processors, which when executing the computer executable instructions, cause the system to archive the database by providing point in time recovery of the database by restoring the database to a selected point in time between adjacent snapshots, by performing the following:
   taking a plurality of snapshots each comprising:
      a data portion comprising pointers to storage locations for data items existing in the database at each respective point in time;
      a log portion comprising a state of the log storage containing records that represent an enumeration of operations performed on the data storage at each respective point in time; and
   restoring the database to a particular point in time between a first point in time and a second point in time that is adjacent to the first point in time, by performing the following:
      for a first snapshot corresponding to the first point in time, performing the following:
         applying the data portion comprising pointers to storage locations for data items existing in the database at the first point in time; and
         applying the log portion comprising a state of the log storage containing records that represent an enumeration of operations performed on the data storage at the first point in time; and
      for a second snapshot corresponding to the adjacent second point in time, applying a portion which comprises some but not all of the log portion of the second snapshot, wherein the applied portion comprises only those log records that represent an enumeration of operations performed on stored data up to the particular point in time between the first point in time and the second point in time.

2. The system of claim 1, wherein first and second snapshots are performed in a unified snapshot of the database.

3. The system of claim 1, wherein the data portion of each snapshot comprises capturing the set of pointers in the data mapping structure at each point in time corresponding to each snapshot.

4. The system of claim 1, wherein size of the log storage of the database is limited to avoid unrestrained expansion by adjusting frequency of the plurality of snapshots taken.

5. The system of claim 1, wherein the database is a distributed database implemented in a cloud environment, such that different portions of the database are implemented on different virtual machines in the cloud environment.

6. The system of claim 1, wherein the database is a versioned database storing different versions of data items.

7. The system of claim 1, wherein the log storage comprises a ring buffer, and wherein storage locations in the log storage are made available, for new records, once existing records in those locations have been captured.

8. A system comprising:
   a database, wherein the database comprises:
   data storage for storing data items;
   log storage for storing log records that comprise a list of operations performed on the data storage at discrete points in time; and
   a mapping structure representing state of the data in the database at any given point in time, the mapping structure comprising a set of pointers to storage locations for data as currently stored at the given point in time;
   one or more physical computer storage media comprising computer executable instructions;

one or more processors, which when executing the computer executable instructions, cause the system to archive the database by providing point in time recovery of the database by restoring the database to a selected point in time between two snapshots, by performing the following:

taking a first snapshot of the database at a first time, and wherein the first snapshot comprises:
  a data portion containing the set of pointers in the mapping structure at the first time corresponding to the first snapshot of the data in the data storage of the databases; and
  a log portion containing the list of any operations performed on data up to the first time corresponding to the first snapshot of the log records in the log storage;
taking one or more additional snapshots of the database at one or more times subsequent to the first time, wherein the one or more additional snapshots each comprise:
  a data portion containing the set of pointers in the mapping structure corresponding to each subsequent time for a taken subsequent snapshot of the data storage; and
  a log portion containing the list of any operations performed on data up to the subsequent time corresponding to each subsequent snapshot, wherein for each additional snapshot the corresponding list of the log portion is a list of all log records occurring after the time of the additional snapshot of the database from a most recent previous snapshot of the database; and
restoring the database to a particular point between two snapshots of the database by performing the following:
  applying the data and log portions of the first snapshot; and
  then applying some but not all of the log portions from two or more of the additional snapshots, wherein the applied log portions comprise only those records that represent an enumeration of operations performed on stored data up to the particular point in time.

9. The system of claim 8, wherein the data portion of each snapshot comprises capturing the set of pointers in the data mapping structure at each point in time corresponding to each snapshot.

10. The system of claim 8, wherein size of the log storage of the database is limited to avoid unrestrained expansion by adjusting frequency of the plurality of snapshots taken.

11. The system of claim 8, wherein the database is a distributed database implemented in a cloud environment, such that different portions of the database are implemented on different virtual machines in the cloud environment.

12. The system of claim 8, wherein the database is a versioned database storing different versions of data items.

13. The system of claim 8, wherein the log storage comprises a ring buffer, and wherein storage locations in the log storage are made available, for new records, once existing records in those locations have been captured.

14. A computer-implemented method for archiving a database by providing point in time recovery of the database, the computer-implemented method being performed by one or more processors executing computer executable instructions for the computer-implemented method, and the computer-implemented method comprising:
taking a plurality of snapshots each comprising:
  a data portion comprising pointers to storage locations for data items existing in the database at each respective point in time;
  a log portion comprising a state of the log storage containing records that represent an enumeration of operations performed on the data storage at each respective point in time; and
restoring the database to a particular point in time between a first point in time and a second point in time that is adjacent to the first point in time, by performing the following:
  for a first snapshot corresponding to the first point in time, performing the following:
    applying the data portion comprising pointers to storage locations for data items existing in the database at the first point in time; and
    applying the log portion comprising a state of the log storage containing records that represent an enumeration of operations performed on the data storage at the first point in time; and
  for a second snapshot corresponding to the adjacent second point in time, applying a portion which comprises some but not all of the log portion of the second snapshot, wherein the applied portion comprises only those log records that represent an enumeration of operations performed on stored data up to the particular point in time between the first point in time and the second point in time.

15. The computer-implemented method of claim 14, wherein after applying the log portion of the first snapshot, the computer-implemented method further comprises:
pausing the recovery;
discarding the data portion of the second snapshot; and
then resuming recovery by applying said portion which comprises some but not all of the log portion of the second snapshot.

16. The computer-implemented method of claim 15, wherein the computer implemented method further comprises:
zeroing out the log portion of the second snapshot that is not applied once the records up to the give point in time have been applied; and
then carrying out an undo operation.

17. The computer-implemented method of claim 14, wherein size of the log storage of the database is limited to avoid unrestrained expansion by adjusting frequency of the plurality of snapshots taken.

18. The computer-implemented method of claim 14, wherein first and second snapshots are performed in a unified snapshot of the database.

19. The computer-implemented method of claim 14, wherein the data portion of each snapshot comprises capturing the set of pointers in the data mapping structure at each point in time corresponding to each snapshot.

20. The computer-implemented method of claim 14, wherein size of the log storage of the database is limited to avoid unrestrained expansion by adjusting frequency of the plurality of snapshots taken.

21. The computer-implemented method of claim 14, wherein the database is a distributed database implemented in a cloud environment, such that different portions of the database are implemented on different virtual machines in the cloud environment.

22. The computer-implemented method of claim 14, wherein the database is a versioned database storing different versions of data items.

23. The computer-implemented method of claim 14, wherein the log storage comprises a ring buffer, and wherein storage locations in the log storage are made available, for new records, once existing records in those locations have been captured.

* * * * *